(12) United States Patent
Ahiska et al.

(10) Patent No.: US 8,405,732 B2
(45) Date of Patent: Mar. 26, 2013

(54) AUTOMATICALLY EXPANDING THE ZOOM CAPABILITY OF A WIDE-ANGLE VIDEO CAMERA

(75) Inventors: Bartu Ahiska, Surrey (GB); Mark Kenneth Davey, Kent (GB); Ahmet Enis Cetin, Ankara (TR)

(73) Assignee: Grandeye, Ltd., Guildford, Surrey (GB)

( * ) Notice: Subject to any disclaimer, the term of this patent is extended or adjusted under 35 U.S.C. 154(b) by 0 days.

(21) Appl. No.: 13/163,194

(22) Filed: Jun. 17, 2011

(65) Prior Publication Data

US 2012/0038776 A1 Feb. 16, 2012

Related U.S. Application Data

(63) Continuation of application No. 11/184,720, filed on Jul. 19, 2005, now Pat. No. 7,990,422.

(60) Provisional application No. 60/589,104, filed on Jul. 19, 2004.

(51) Int. Cl.
*H04N 5/232* (2006.01)
*H04N 7/18* (2006.01)

(52) U.S. Cl. ............... 348/211.3; 348/143; 348/169; 348/218.1; 348/222.1

(58) Field of Classification Search ............... None
See application file for complete search history.

(56) References Cited

U.S. PATENT DOCUMENTS

| | | | |
|---|---|---|---|
| 3,505,465 A | 4/1970 | Rees | |
| 3,725,563 A | 4/1973 | Woycechowsky | |
| 4,326,218 A | 4/1982 | Coutta et al. | |
| 4,549,208 A | 10/1985 | Kamejima et al. | |
| 4,667,236 A | 5/1987 | Dresdner | |
| 4,728,839 A | 3/1988 | Coughlan et al. | |
| 4,763,280 A | 8/1988 | Robinson et al. | |
| 4,821,209 A | 4/1989 | Hempel et al. | |
| 4,992,866 A | 2/1991 | Morgan | |
| 5,027,287 A | 6/1991 | Artigalas et al. | |
| 5,164,827 A | 11/1992 | Paff | |
| 5,185,667 A | 2/1993 | Zimmermann | |
| 5,212,547 A | 5/1993 | Otsuki | |
| 5,311,305 A | 5/1994 | Mahadevan et al. | |
| 5,313,306 A | 5/1994 | Kuban et al. | |
| 5,321,776 A | 6/1994 | Shapiro | |
| 5,359,363 A | 10/1994 | Kuban et al. | |

(Continued)

FOREIGN PATENT DOCUMENTS

EP 1 341 383 A2 9/2003
WO 02/062056 A1 8/2002

OTHER PUBLICATIONS

Collins et al., "A System for Video Surveillance and Monitoring," Proc. American Nuclear Society (ANS) Eighth International Topical Meeting on Robotics and Remote Systems, Apr. 25-29, 1999, Pittsburgh, PA.

(Continued)

*Primary Examiner* — Ngoc-Yen Vu
(74) *Attorney, Agent, or Firm* — Robert O. Groover, III; Groover & Associates PLLC; Seth A. Horwitz

(57) ABSTRACT

A system for automatically expanding the zoom capability of a wide-angle video camera using images from multiple camera locations. One preferred embodiment achieves this using images from the wide-angle video camera that are analyzed to identify regions of interest (RoI). Pan-Tilt-Zoom (PTZ) controls are then sent to aim slave cameras toward the RoI. Processing circuitry is then used to replace the RoI from the wide-angle images with the higher-resolution images from one of the slave cameras. In addition, motion-detecting software can be utilized to automatically detect, track, and/or zoom in on moving objects.

20 Claims, 9 Drawing Sheets

U.S. PATENT DOCUMENTS

| | | | |
|---|---|---|---|
| 5,365,597 | A | 11/1994 | Holeva |
| 5,384,588 | A | 1/1995 | Martin et al. |
| 5,394,209 | A | 2/1995 | Stiepel et al. |
| 5,396,284 | A | 3/1995 | Freeman |
| RE34,989 | E | 7/1995 | Struhs et al. |
| 5,434,617 | A | 7/1995 | Bianchi |
| 5,495,292 | A | 2/1996 | Zhang et al. |
| 5,530,650 | A | 6/1996 | Biferno et al. |
| 5,539,483 | A | 7/1996 | Nalwa |
| 5,563,650 | A | 10/1996 | Poelstra |
| 5,589,901 | A | 12/1996 | Means |
| 5,610,391 | A | 3/1997 | Ringlien |
| 5,627,616 | A | 5/1997 | Sergeant et al. |
| 5,654,750 | A | 8/1997 | Weil et al. |
| 5,666,157 | A | 9/1997 | Aviv |
| 5,684,937 | A | 11/1997 | Oxaal |
| 6,049,281 | A | 4/2000 | Osterweil |
| 6,147,709 | A | 11/2000 | Martin et al. |
| 6,215,519 | B1 | 4/2001 | Nayar et al. |
| 6,243,099 | B1 | 6/2001 | Oxaal |
| 6,344,852 | B1 | 2/2002 | Zhu et al. |
| 6,509,926 | B1 | 1/2003 | Mills et al. |
| 6,724,421 | B1 | 4/2004 | Glatt |
| 6,757,434 | B2 | 6/2004 | Miled et al. |
| 6,763,068 | B2 | 7/2004 | Oktem |
| 6,853,809 | B2 | 2/2005 | Pelletier |
| 7,366,359 | B1 | 4/2008 | Davey |
| 7,450,165 | B2 | 11/2008 | Ahiska |
| 7,528,881 | B2 | 5/2009 | Ahiska |
| 7,529,424 | B2 | 5/2009 | Ahiska |
| 8,238,695 | B1 * | 8/2012 | Davey et al. .................. 382/299 |
| 8,264,524 | B1 * | 9/2012 | Davey .............................. 348/36 |
| 2002/0063711 | A1 | 5/2002 | Park et al. |
| 2003/0128756 | A1 | 7/2003 | Oktem |
| 2003/0210329 | A1 | 11/2003 | Aagaard et al. |
| 2005/0007453 | A1 | 1/2005 | Ahiska |
| 2005/0018045 | A1 | 1/2005 | Thomas et al. |
| 2006/0197839 | A1 | 9/2006 | Senior et al. |

OTHER PUBLICATIONS

Stauffer et al., "Adaptive Background Mixture Models for Real-Time Tracking" Proc. IEEE CS Cont, on Computer Vision and Pattern Recognition, 1999, pp. 246-252, vol. 2.

Comaniciu et al., "Real-Time Tracking of Non-Rigid Objects Using Mean Shift," IEEE Computer Vision and Patterns Recognition, 2000, pp. 1-8, vol. 1.

Aube, 12th International Conference on Automatic Fire Detection, 2001.

Bagci et al., "Moving Object Detection Using Adaptive Subband Decomposition and Fractional Lower-Order Statistics in Video Sequences," Signal Processing 82, pp. 1941-1947, Dec. 2002.

Ipek et al., "Correlation Tracking Based on Wavelet Domain Information," Proceedings of SPIE vol. 5204, pp. 97-105, Aug. 2003, San Diego.

Zhou et al., "A Master-Slave System to Acquire Biometric Imagery of Humans at Distance," ACM International Workshop on Video Surveillance, pp. 113-120, Nov. 7, 2003.

V. Nalva, "A True Omni-Directional Viewer," Bell Laboratories Technical Memorandum, BL0115500-960115-01 (Jan. 1996).

S. E. Chen, "Quick Time .RTM. VR—An Image-Based Approach to Virtual Environment Navigation," Proceedings of SIGGRAPH 1995, Los Angeles, CA, Aug. 6-11, 1995.

Leonard McMillan and Gary Bishop, "Plenoptic Modelilng: an Image-Based Rendering System," Proceedings of SIGGRAPH 1995, Los Angeles, CA, Aug. 6-11, 1995.

K. Yamazawa et al., "Obstacle Detection with Omnidirectional Image Sensor HyperOmni Vision," Proc. of 1995 IEEE Intern. Conf. on Robotics and Automation, vol. 1, pp. 1062-1067, 1995.

Y. Yagi et al., "Evaluating Effectivity of Map Generation by Tracking Vertical Edges in Omnidirectional Image Sequence," Proc. 1995 IEEE Intern. Conf. Robotics and Autom. p. 2334.

Y. Yagi et al., "Map-based Navigation for a Mobile Robot with Omnidirectional Image Sensor COPIS," IEEE Trans on Robotics and Automation, V. 11, No. 5, pp. 634-648 (IEEE Oct. 1995).

Shree K. Nayar et al., "Omnidirectional VSAM Systems: PI Report," Proceeding of DARPA, Image Understanding Workshop, New Orleans, pp. 55-61, May 1997.

Jo Baglow, "Covert Surveillance," Security Technolkogy & Design, pp. 58-59, Dec. 1997.

Shree K. Nayar, "Omnifirectional Video Camera," Proc.. of DARPA Image Understanding Wrokshop, New Orleans, May 1997.

Shree Nayar et al., "Catadioptric Image Formation," Proc. of DARPA Image Understanding Workshop, New Orleans, May 1997.

S. Bogner, "Introduction to Panospheric Imaging", Proceedings of the 1995 IEEE International Conference on Systems, Man and Cybernetics, pp. 3099-3106 (1995).

S. Bogner, "Application of Panospheric Imaging to an Armored Vehicle Viewing System", Proc. of the 1995 IEEE International Con. on Systems, Man and Cybernetics, pp. 3113-3116.

S. Bogner et al., "The Impact of Panospheric Imaging on Cockpit Displays," SPIE's 11th Annual Symp. on Aerospace/Defense Sensing, Simulation and Controls, pp. 1-11, Apr. 1997.

J. Murphy, "Application of Panospheric Imaging to a Teleoperated Lunar Rover", Proceedings of the 1995 IEEE Internaitonal Conference on Systems, Man and Cybernetics, pp. 3117-.

E. Hall et al., "Omnidirectional Viewing Using a Fish Eye Lens," SPIE—Optics, Illimination, and Image Sensing for Machine Vision, vol. 728, pp. 250-256 (1986).

S. Zimmermann et al., "A Video Pan/Tilt/Magnify/Rotate System with no Moving Parts." Proceedings of 1992 IEEE. A1AA 11th Digital Avionics Systems Conf. pp. 523-531 (IEEE, 1992).

* cited by examiner

AUTOMATICALLY EXPANDING THE ZOOM CAPABILITY OF A WIDE-ANGLE VIDEO CAMERA

CROSS-REFERENCE TO OTHER APPLICATIONS

This application claims priority from provisional U.S. patent application 60/589,104 filed Jul. 19, 2004, which is hereby incorporated by reference.

BACKGROUND AND SUMMARY OF THE INVENTION

1. Field of the Invention

The present inventions relate to video monitoring systems, and more specifically, to automatically expanding the zoom capability of a wide-angle video camera.

2. Background

Real-time video surveillance systems have become increasingly popular in security monitoring applications. A new class of cameras replaces the mechanical Pan-Tilt-Zoom (PTZ) functions with a wide-angle optical system and image processing, as discussed in U.S. patent application Ser. No. 10/837,019 entitled "Method of Simultaneously Displaying Multiple Views for Video Surveillance," which is hereby incorporated by reference. This class of cameras is further discussed in U.S. patent application Ser. No. 10/837,325 entitled "Multiple View Processing in Wide-Angle Video Camera," which is hereby incorporated by reference. This type of camera monitors a wide field of view and selects regions from it to transmit to a base station; in this way it emulates the behavior of a mechanical PTZ camera. The wide-angle optics introduces distortion into the captured image, and processing algorithms are used to correct the distortion and convert it to a view that has the same perspective as a mechanical PTZ camera.

The U.S. patent application Ser. No. 10/837,326 entitled, "Multiple Object Processing in Wide-Angle Video Camera" by Yavuz Ahiska, which is hereby incorporated by reference, describes a way to correct the distorted view captured by a wide-angle camera. This camera, even using this distortion-correction process, only has limited capabilities to zoom into a region of interest. The camera can also be a programmable one as described in U.S. patent application Ser. No. 10/837,325, entitled "Multiple View Processing in Wide-Angle Video Camera," containing programmable embedded microprocessors.

There exists a conflict between a video camera's field of view and the effective resolution of its image. Wide-angle lenses rarely offer any significant optical zoom, and similarly, video cameras with a high zoom capability have restricted fields of view (especially when their magnification is increased).

A solution to monitoring a wide-angle area while being able to capture regions at a higher detail is to utilize multiple cameras at differing locations. The U.S. Pat. No. 6,724,421, which is hereby incorporated by reference, and the public domain document, "A Master-Slave System to Acquire Biometric Imagery of Humans at Distance," by X. Zhou et al, which is hereby incorporated by reference, describe systems using multiple cameras to monitor a wide-angle area. In these systems, a separate base station unit controls the two cameras monitoring the scene. In addition, these systems do not try to expand the zoom function of the master camera.

The U.S. Pat. No. 6,147,709, which is hereby incorporated by reference, describes a method and apparatus for overlaying a high-resolution image onto a hemispherical interactive image captured by a camera by matching at least three points between the high-resolution image and the perspective corrected image. A major drawback with this process is that it makes comparisons in the perspective corrected domain.

Moving regions in a video corresponding to persons or moving objects, together with tracked objects which may no longer be moving, and their local neighborhoods in the video define Regions of Interest (RoI) because persons, moving and/or tracked objects, etc. are important in security monitoring applications. In order to provide real-time alarms for dangerous events, RoI should be tracked and zoomed for closer inspection. Conventional Closed Circuit Television (CCTV) systems, which only capture recorded video for later analysis, cannot provide automatic alarm and event triggers without delay.

A wide field of view camera that can both monitor a wide-angle scene, while also being able to simultaneously and automatically capture regions of interest at a greater magnification is very desirable in surveillance systems. For example, a high-resolution image could make the difference in positively identifying a criminal committing an offense or the detail surrounding an unattended suitcase. Therefore, it is very important to provide a high-resolution view of a person in a surveillance application.

Wide-angle surveillance is necessary in many CCTV applications. Cameras such as dome cameras and cameras with fisheye or peripheral lenses can produce wide-angle video. A major weakness of wide-angle surveillance cameras and systems is that they either do not have the capability to zoom into a RoI or are limited in their zooming capability.

The system can also have a computer program comprising a machine-readable medium having computer executable program instructions thereon for executing the moving object detection and object tracking algorithms fully in the programmable camera device as described in U.S. patent application Ser. No. 10/924,279, entitled "Tracking Moving Objects in Video Using Wavelet Domain Information," by A. E. Cetin and Y. Ahiska, which is hereby incorporated by reference. Automatic moving-object detection and object tracking capability of the wide field of view camera can define a RoI in the wide-angle scene monitored by the camera containing the object in question. As this RoI will be of interest in many security applications, the region can be tracked by the electronic PTZ capability of the master camera.

There is a present demand for a system that can both monitor a wide area, while also being able to simultaneously and automatically capture regions of interest at a higher resolution.

Automatically Expanding the Zoom Capability of a Wide-Angle Video Camera

The present innovations include a new approach that achieves the ability to monitor a wide-angle area while being able to capture regions of higher detail.

In one example embodiment, a wide-angle, master camera, such as a dome camera or a camera with a fish-eye or peripheral lens, preferably with substantially no zoom capabilities, is used to capture images and automatically identify RoI, e.g. motion detecting and/or object tracking. In this embodiment, at least one other camera, preferably with expanded zoom capabilities relative to the master camera, can be used to zoom into the identified RoI. The views from the cameras other than the master camera can be used for several purposes including, but not limited to, input into the master camera or output to a base station.

In another example embodiment, control circuitry sends PTZ controls to one or more slave cameras based in at least partial dependence on the wide-angle images captured by the master camera. Among other things, these controls can be used to aim the slave camera towards the RoI and/or zoom the slave camera onto the RoI.

In another class of embodiments, the output of a slave camera is compared to the images captured by the master camera and PTZ controls are sent to one or more slave cameras based in at least partial dependence on the comparison. Output images from the slave cameras can then be used for several purposes including, but not limited to, comparing them to RoI from the master camera, outputting them to a base station, or overlaying them onto other images.

In a sample of this embodiment, after the slave camera has moved in accordance with the PTZ controls, the output from the slave camera can be compared to the images from the master camera to generate a new set of PTZ controls. This process can be, but does not have to be, used to match the output images from the slave camera to the RoI identified in the output images from the master camera. This process can be, but does not have to be, an iterative process that can be repeated to yield any level of desired matching accuracy. There are multiple methods for implementing this synchronization including, but not limited to image-processing techniques to match views, calibration procedures, or position analysis of feedback from the slave camera.

In another example embodiment, the images from the slave camera can be used to replace, correct, inset, or overlay some or all of the images from the master camera. The composite images can be used for several purposes including, but not limited to, recording them, outputting them to a base station, and/or using them to generate PTZ controls.

In another embodiment, several slave cameras, preferable monitoring different regions, can be used and the perspective-corrected view of the master camera can be altered in at least partial dependence on the adjusted views of at least one of these slave cameras.

In another embodiment, motion-detecting software can be utilized to define the RoI as moving regions in the video corresponding to, but not limited to, persons, moving objects, tracked objects which may no longer be moving, and/or their local neighborhoods in the video.

These and other embodiments of the present innovations are described more fully below.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
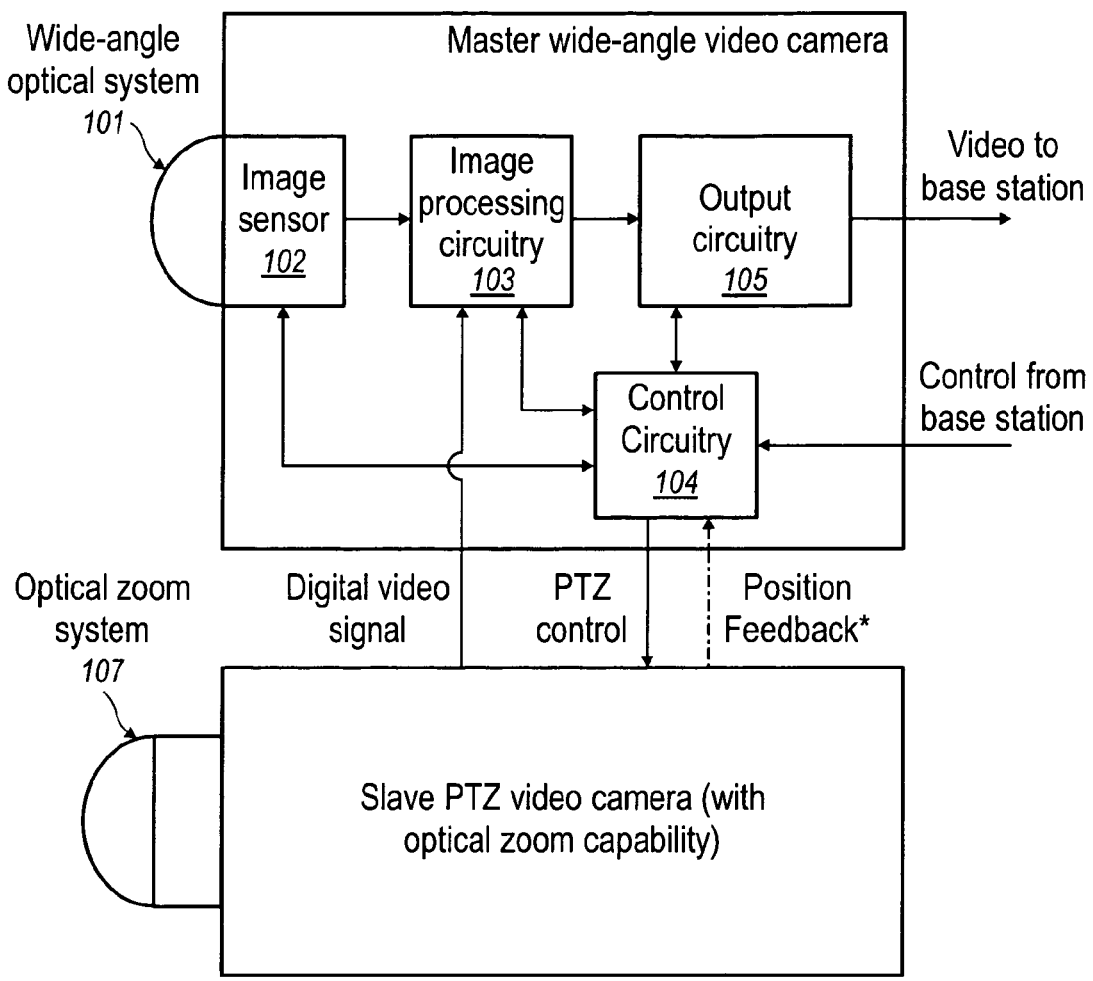
FIG. 1A shows a diagram of a camera system consistent with a preferred embodiment of the present invention.

The numerous innovative teachings of the present application will be described with particular reference to the presently preferred embodiment (by way of example, and not of limitation).

Before the present innovations, the systems available only had limited zoom capabilities, but using a slave PTZ camera controlled from the master camera can expand this electronic-zooming capability to get even higher resolution images of the RoI.

Unlike U.S. Pat. No. 6,147,709, the method and systems disclosed below which make comparisons do so in the wide-angle distorted domain within the master camera, as opposed to the perspective corrected domain, to generate PTZ commands for controlling a slave PTZ video camera. This can be an iterative process, and yields the desired matching accuracy given enough steps.

The control system within the master camera that performs view matching between a master, wide-angle video camera and a slave PTZ camera allows the master camera to acquire detailed images of required areas from the slave camera. There are multiple methods for implementing this synchronization namely using image-processing techniques to match views and/or by a calibration procedure. Position feedback from the slave camera can also be a useful element of information for accurate view matching The U.S. Pat. No. 6,509,926 entitled "Surveillance Apparatus for Camera Surveillance System," which is hereby incorporated by reference, discusses a system for generating the azimuth and elevation angles of a camera and lens. Carrying out this process in the distorted domain allows the comparison to be made without losing anything in terms of quality. Comparing images or vectors x and y can be measured many different ways, the most well known way is the Euclidian distance, $\|x-y\|$, but can also use $\|g(x)-g(y)\|$ where g is an appropriate function representing the distortion.

In a preferred embodiment, the master wide-angle camera has the capability of sending PTZ control signals to the slave PTZ camera to zoom into the RoI in an automatic manner by implementing the motion-detection and/or object tracking algorithms on the current wide field of view image. In an example embodiment, the slave is commanded to go to a set angle, which can be described as a PTZ control although it is not the standard widespread PTZ interface. A control system resident in the master camera can perform view matching between the master, wide-angle video camera and the slave PTZ camera. One preferred embodiment uses image-processing techniques to match the views of the master and slave cameras, allowing detailed images of the RoI to be acquired.

In one class of embodiments, the master and slave cameras are calibrated and PTZ controls can be sent to the slave camera based at least partially on these calibrations. If calibration between the master and slave cameras is insufficient alone, image registration or matching can be carried out either using the corrected images of the scene or using the raw wide-angle images captured by the master camera.

The following is one possible example of the calibration process between the master and slave cameras. It provides a switching mode where the master camera's output can be switched to the slave camera's output, the switch can be based on a predefined zoom point where the slave camera's position can then be lined up with the master camera's selected view and, if slave tracking is being used, the slave camera can be used to follow an object being tracked by motion tracking. The master camera's wide-angle view can be divided into smaller regions and, using image processing, these regions can be zoomed in on. By tracking these smaller views, the master camera is acting as a virtual camera, or VCAM. As mentioned earlier, the zoomed in VCAM views have smoothed edges and blurred details. The slave camera views are needed to capture the level of detail required in most surveillance applications.

Manual Mode:

The video of Head A (in one preferred embodiment this refers to view of the output from the master camera) is switched to the video output of the slave camera on pressing the enter key. Once switched, keyboard control of the slave camera is provided. The slave camera can then be manually calibrated to aim at the same object as the master camera. Pressing escape returns the video and keyboard control to the master camera. In another example embodiment, there can be two analogue outputs from the master camera, each referred to as a Head. A monitor can view the output from a Head. There can be BNC connectors at the back of the master camera, labeled A and B so that a monitor can be connected to either Head A or Head B.

Zoom Switch Mode:

While controlling any VCAM on Head A, if the field of view goes beyond 25 degrees, the video is switched to the slave camera and it is moved to the same position as the master camera's VCAM. An option is provided for pre-positioning. If this option is turned on, the slave camera will be moved to the position of the master camera's VCAM at a zoom level of 30 degrees and is repositioned until the zoom level reaches 25 degrees at which point the video is switched to the slave camera. Once switched, keyboard control of the slave camera is provided. Pressing escape returns the video and keyboard control to the master camera.

Slave Tracking Mode:

Whenever motion tracking is triggered, Head A is switched to the slave camera and the slave camera is moved to the position of the motion rectangle being tracked and is updated as the motion rectangle moves. If the motion rectangle stops moving or slows down the slave camera is zoomed in and will zoom out again if the motion rectangle moves faster again. If the user moves the joystick, control of the slave camera will be given to them. If after 5 seconds of no activity from the keyboard the camera is still tracking, it will return the slave camera to tracking the motion rectangle. If tracking has ended control and video will be returned to the master camera.

Design

Three additional classes were required in order to implement the master/slave features; slavecalibration, slavemanager and serialout. The code described here is enabled via the abspos setting within the adome.ini.

Slave Calibration:

This class is responsible for calibrating the master camera with the slave camera and translating between the master camera spherical coordinates and slave camera spherical coordinates.

The calibration phase is run by positioning the slave camera at a reference point. Its video output is then displayed on Head A while a VCAM is positioned at the same reference point. (but in the coordinate system of the master camera). The user then has control of positioning of the master camera's VCAM and should line up the VCAM to match the image from the slave camera. Once matched, the user would press enter and the current position of the VCAM would be read. The difference in pan between the reference point and the new position of the VCAM is stored for later use by the translation function. For the calibration phase the slavecalibration class collaborates with the Menus class and it is possible to use more than one reference point if required without changing the Menus class (see GenerateCalibrationPresets function of the slavecalibration class).

The second responsibility of the slavecalibration class is to provide a translation of the master camera's coordinates to the slave camera's coordinates for the slavemanager class. This is done in the TranslateToSlaveCoordinates function by firstly assuming that the point being viewed is a distance of 5 meters away. The spherical coordinates are then translated into Cartesian coordinates. A rotation in the z-axis by the difference in pan that was measured during the calibration phase is then made. A translation in x and z coordinates is then made. This translation is accounting for the physical distance between the two cameras (including their difference in height). The mounting kit will ensure that the distance between the two cameras is constant along the x-axis. As the height of the slave cameras can be different from one another the z-axis translation depends on which slave camera is connected. The final stage is to convert the translated and rotated Cartesian coordinates back into spherical coordinates.

Slavemanager:

The slavemanager class is responsible for checking the zoom level for when to switch to the slave camera, switching the video to the slave camera, positioning the slave camera and dealing with timeouts from no keyboard activity.

The ProcessSlaveMode function is called once per frame. If the zoom switch is enabled it will check the zoom level of the active VCAM on Head A and if it is under 25 it will switch to the slave camera and position it by calling the SetSlaveMode function (described below). If prepositioning is enabled it will also position the slave camera, but not switch to it when the zoom level is between 30 and 25. This is done by calling the SwitchSlaveToNearestPreset function (described below). A timer is managed by the class in order to deal with timeouts from slave mode and slave tracking mode. This timer is checked in this function and the appropriate mode entered after a timeout. The timer is reset by calling the SlaveMoved function (this is done by serialOut and serial described below).

The SetSlaveMode function switches the video to the slave camera and positions it. The switch to the slave camera video is done by setting a bit of the register controlling the CPLD via an i2c write. The positioning is carried out by reading the current position of the active VCAM, translating the coordinates by calling the TranslateToSlaveCoordinates function of the slavecalibration class and passing it to the output queue for the serialout class to deal with (described below).

The SwitchSlaveToNearestPreset function takes the master camera's spherical coordinates, uses the TranslateToSlaveCoordinates function of the slavecalibration class and passing it to the output queue for the serialout class to deal with (described below). This is used by the prepositioning and by the MotionTracker class for slave tracking (described below).

Serialout:

The serialout class is responsible for sending commands to the slave camera via RS485. The serialout class runs a separate thread, which blocks on the output queue until a command is added to the queue. Once a command is added to the queue it calls the appropriate send function on the serial class.

In addition to the new classes described above some changes have been made to existing classes. The key changes are described below:

Serial:

The serial class that deals with keyboard input has the addition of a passthrough mode which is enabled when in slave mode, slave tracking mode or slave calibration mode. In the passthrough mode all commands received are passed out of the second serial port (the one connected to the slave dome). The escape key is captured by the serial class while in this mode and slave mode is disabled when it is received (by calling the SetSlaveMode function of SlaveManager). While in this mode the SlaveMoved function of Slavemanager is called every time a command is received from the keyboard and passed through. This prevents the slavemanager from timing out of the mode by reseting its timer.

Motion Tracker:

The MotionTracker class, that deals with motion tracking, has an additional function, SetSlavePos, that is called when the motion tracking moves the tracking VCAM camera slave tracking is enabled.

The SetSlavePos function takes the raw motion rectangle and the zoom level decided upon by the motion detection and tracking algorithms used for the tracking VCAM. It then attempts to position the slave camera so that it is centered on the top half of the motion rectangle (this is a simple aim high system attempting to aim for the persons head). If the position decided upon for the slave is less than a defined threshold away from the current position of the slave camera, the slave camera is left where it is. This is in order to reduce the number of small moves made by the slave camera—when the slave camera is moved it stops quite suddenly so a slight vibration effect can be noticed so the algorithm prefers larger movements rather than lots of small movements in order to reduce the impact of this effect.

If the motion rectangle is moving slowly or stops the algorithm will cause the slave camera to zoom in further than the zoom value calculated by the VCAM's motion tracking algorithm. This is achieved by creating a m_DistanceMoved variable. This variable is set to 100 when tracking begins. During tracking the value is recalculated by taking 80% of its current value and 20% of the distance the slave dome has been moved by (straight line distance) since the last time it was moved. When this value drops below 3 the zoom level is increased before the slave camera is positioned. If the value is greater than or equal to 3 the zoom level is set to the one calculated by the VCAM's motion tracking algorithm. The above embodiments are only example implementations and are not intended to limit the many possible ways that the present innovations can be implemented.

In one example embodiment, the images are compared in the same domain, e.g., distorted or corrected domain. In order to compare images in the wide-angle image domain, the images of the slave camera go through a reverse transformation into a distorted view similar to that of a portion of the raw wide-angle image of the master camera. The images can then be compared and, in one example embodiment, controls can be sent in at least partial dependence on the results of this comparison. The master camera can adjust the PTZ control signals according to the image matching results so that RoI is in the center of the field of view of the slave camera.

Image matching can be implemented in an iterative manner to increase the accuracy of the view matching between the RoI and the field of view of the slave camera or cameras. This image matching can be done in many ways. Some of these methods are described in the public domain textbook, "Fundamentals of Digital Image Processing" by Anil Jain, Prentice-Hall, N.J., 1988. In an example of this embodiment, the master camera can send incremental PTZ control signals in order to achieve any level of desired matching accuracy.

Once the two images are matched or registered, the perspective corrected view of the master camera can be replaced by the revised view from the slave camera to have a higher resolution image of the RoI than would have been possible with the zooming capability of the master camera alone. The slave PTZ camera, having optical zooming capability, produces a sharper image of the RoI compared to the corrected view of the RoI obtained from the master wide-angle camera. This is because some wide-angle cameras zoom into a region by performing numerical interpolation, which may smooth the edges of the objects in the RoI. In this example embodiment, replacing an image from the master camera with the sharper image obtained from the slave camera expands the zooming capability of the master camera.

Figure 1B:
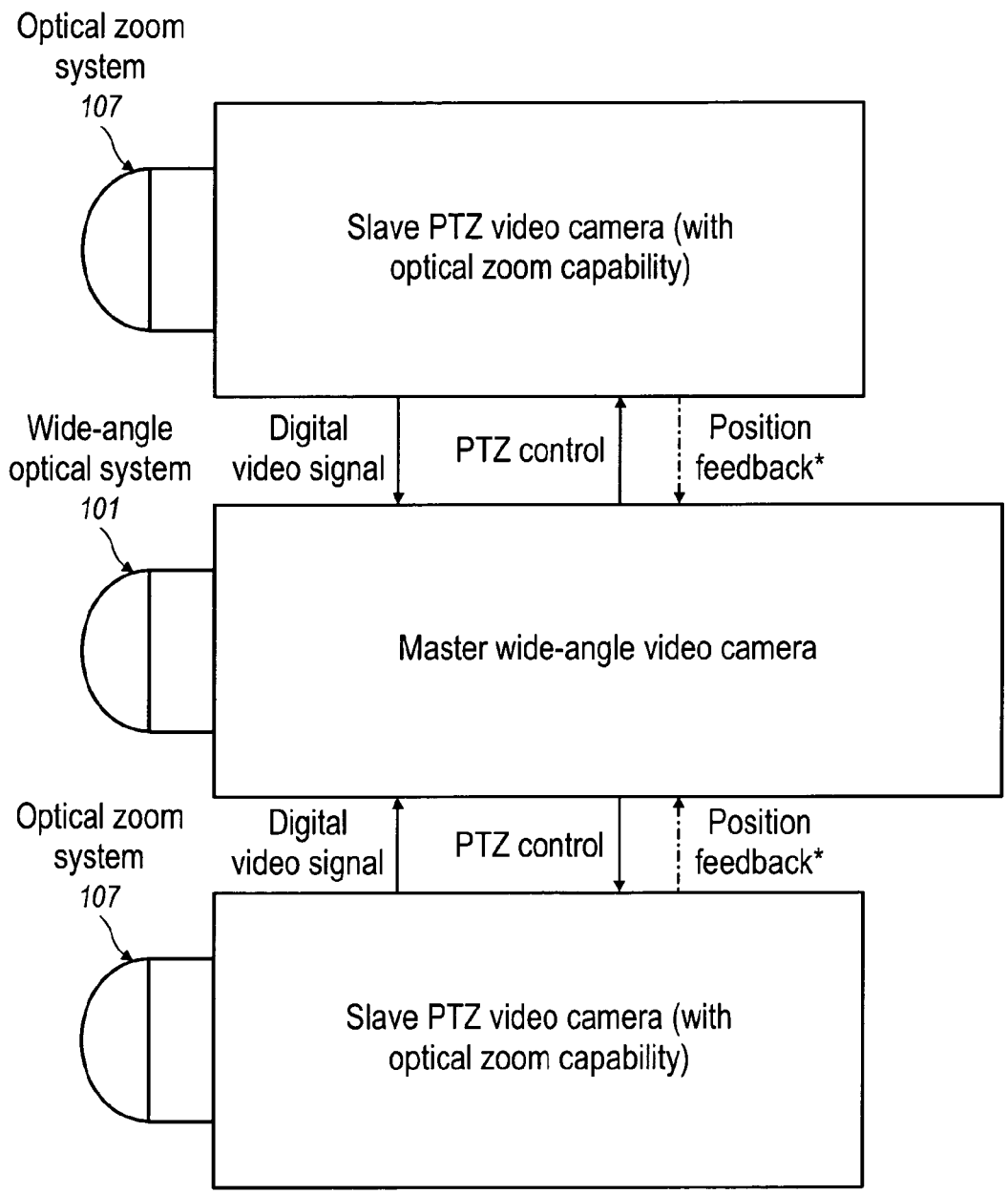
FIG. 1B shows a diagram of a camera system consistent with a preferred embodiment of the present invention.
Figure 2:
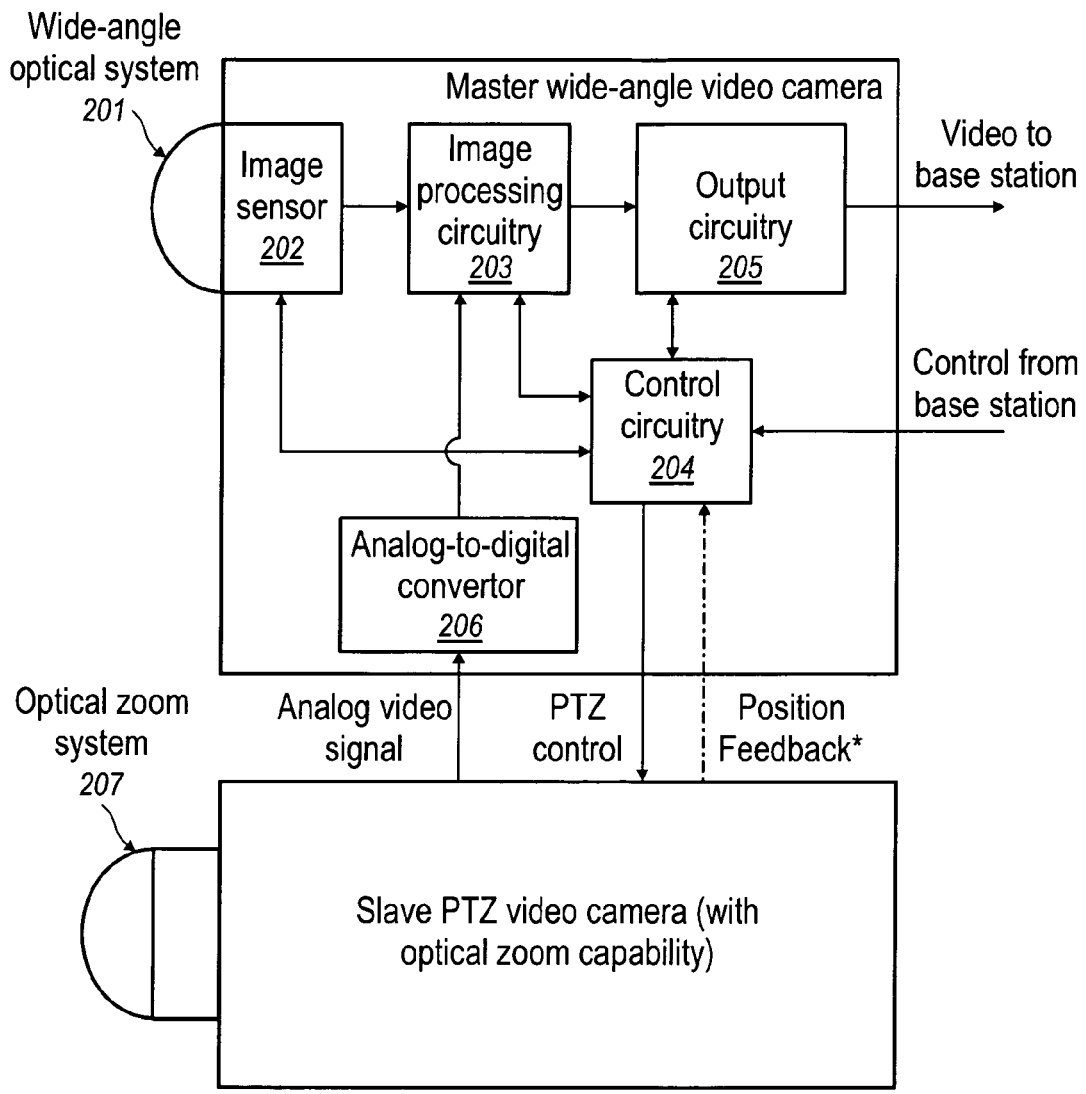
FIG. 2 shows a diagram of a camera system consistent with a preferred embodiment of the present invention.
Figure 3:
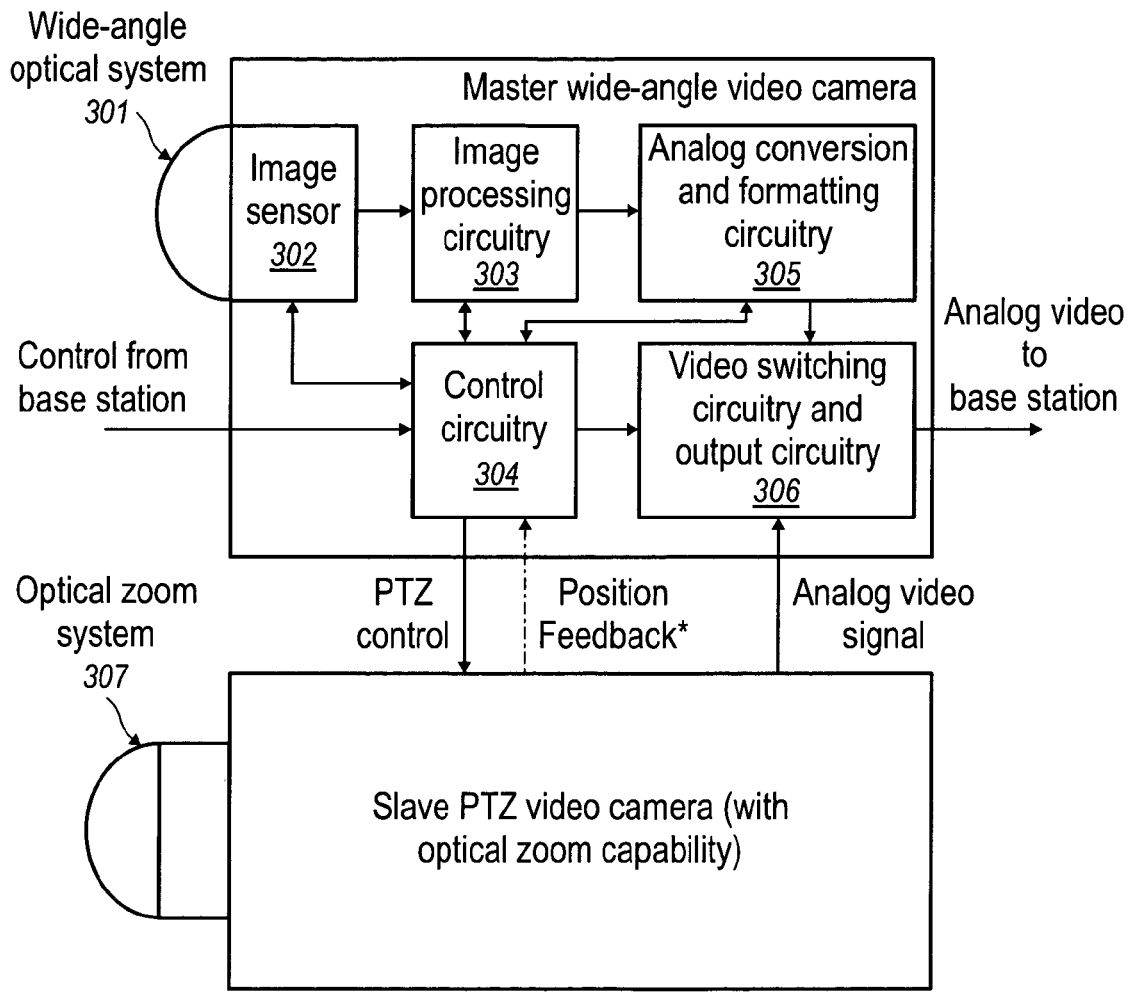
FIG. 3 shows a diagram of a camera system consistent with a preferred embodiment of the present invention.
Figure 4:
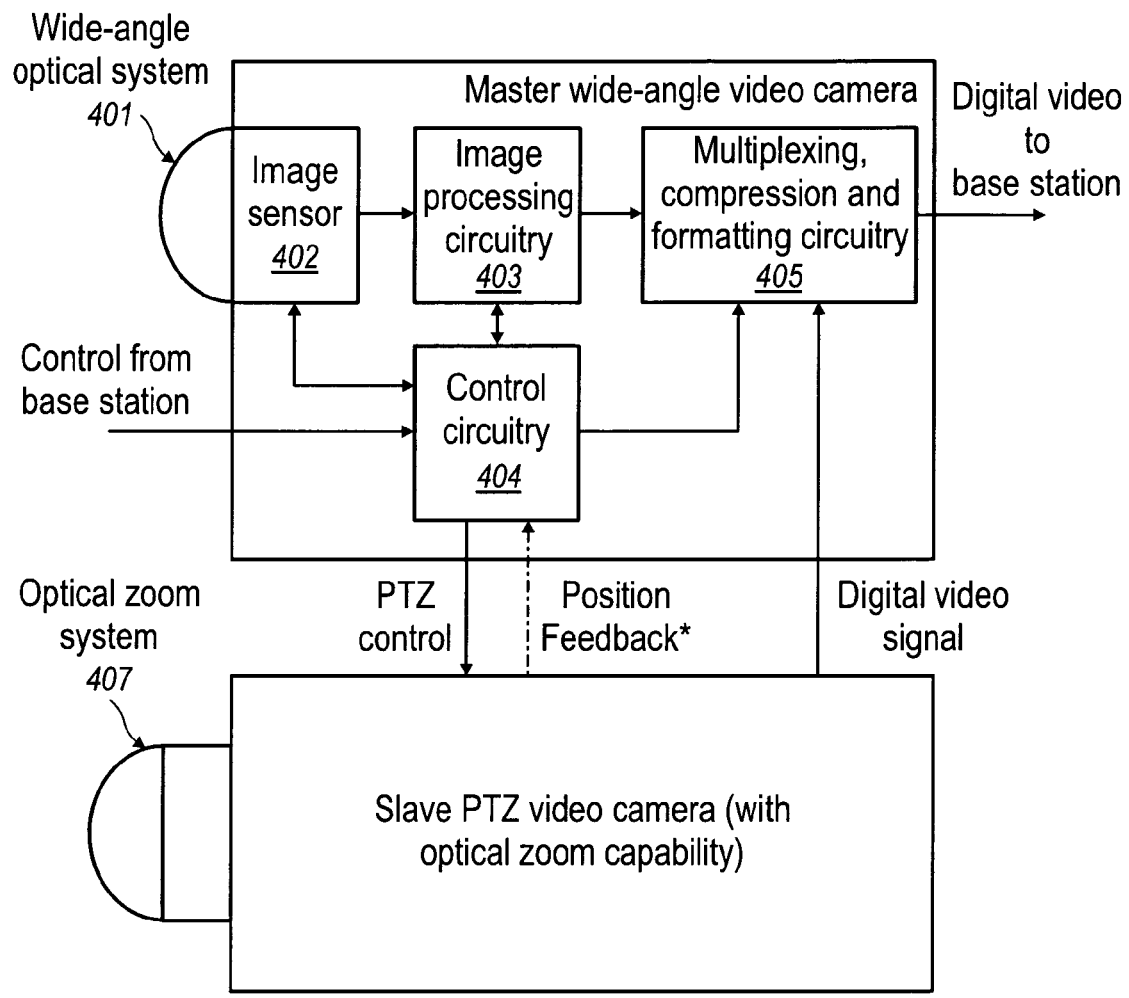
FIG. 4 shows a diagram of a camera system consistent with a preferred embodiment of the present invention.
Figure 5:
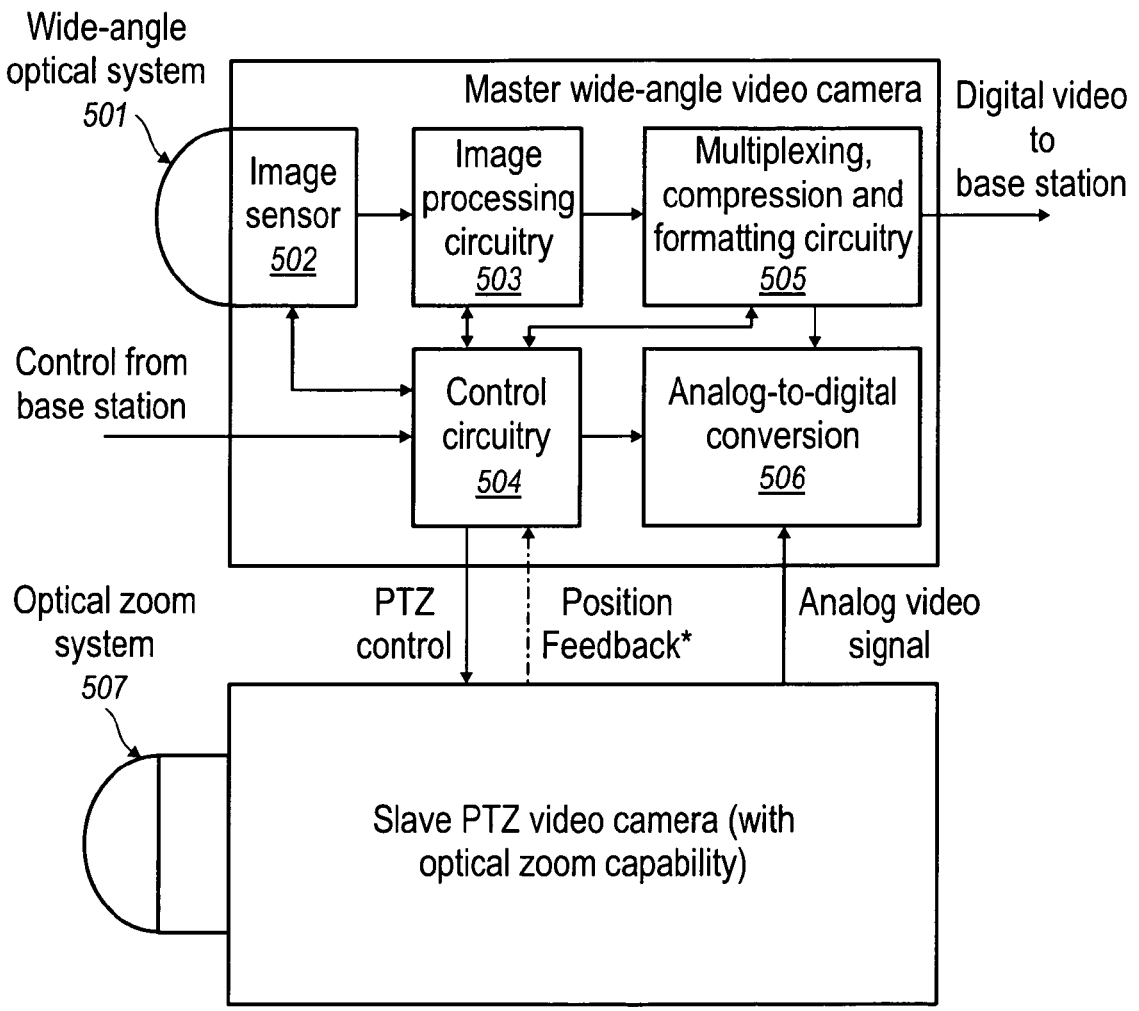
FIG. 5 shows a diagram of a camera system consistent with a preferred embodiment of the present invention.

Examples of preferred embodiments are shown in FIGS. 1 through 9. An example embodiment of the inventions is shown in FIGS. 3, 4, and 5 containing programmable embedded microprocessors and circuitry. A preferred embodiment can have the capability of performing all necessary image processing operations to achieve an expanded optical zoom.

FIG. 1A shows a preferred layout for the system including a preferred embodiment of the master wide-angle camera. The wide-angle optical system, 101 in conjunction with the image sensor 102, captures an image that can be passed to the image processing circuitry 103 for correction. In one example embodiment, the correction can be an image warp that compensates for distortions introduced by the lens. As disclosed in U.S. patent application Ser. No. 10/837,012, entitled, "Correction of Optical Distortion by Image Processing," which is hereby incorporated by reference, the distortion may be arbitrarily complex. The distortion can be corrected through the use of tables that define the necessary warping. The image processing circuitry 103, which has a memory, can be implemented in several ways, including either one or a cascaded set of microprocessors coupled with a high bandwidth bus to increase the available processing capability. The digital sensor data can be sent to the image processing circuitry 103 through a buffer or directly if the circuitry operates at a sufficiently high speed. This circuitry can also be responsible for debayering, color equalization and color balancing of the image. Characteristics of the image sensing 102, such as the exposure and aperture, and the image processing 103 can be controlled by the control circuitry 104. The output circuitry 105 can be used to out put a video signal to the base station.

The image processing circuitry 103 in the master camera can also take the digital video from the slave PTZ camera as another input. The view from the slave camera can be used when an image with a greater optical zoom is desired for improved detailed. The decision for whether the view from the slave is necessary can be dictated by the control circuitry resident in the master camera 104, which acts on a resident software program and from base station control. The control from the base station can be any standard, including RS485 or TCP/IP format. The slave camera is not controlled directly from the base station, but via the control circuitry, preferably in the master camera 104.

In an example embodiment, the control circuitry 104 performs any required view matching between the master, wide-angle video camera and the slave PTZ camera. PTZ controls can be transmitted to the slave camera from the control circuitry in the master camera to achieve an initial approximate matching. This approximation can, for example, PTZ presets in the slave camera. There is an optional position feedback signal from the slave camera, which aids the control circuitry in positioning the slave PTZ camera to the desired location.

In a preferred embodiment, this matching can be assisted using image-processing techniques to match the views. In order to compare images in the wide-angle image domain, the digital video output of the slave PTZ camera may go through a reverse transformation in the image processing circuitry 103 into a distorted slave image similar to that of a portion of the raw wide-angle image of the master camera. The reverse transformation can take a rectangular image from the slave camera and can transform it into a more complex shape with curved sides in the space of the distorted wide-angle image.

In one example embodiment, the reverse transformation can be considered to take place in two stages in the image processing circuitry 103. Given knowledge of the pan, tilt and zoom of the slave camera, the first stage transforms (x,y) coordinates in the slave image into world coordinates (.theta., .phi.). This is the inverse of the transformation used to generate corrected images within the master camera. If position feedback from the zoom level is unavailable, it can be ensured that the transition between master and slave views is always performed at the same zoom. Once world coordinates have been calculated, the second stage involves a projection from world coordinates to the distorted image using a look-up table. This two-stage projection may be applied to individual pixels, to triangles that tessellate the slave image, or any other shape that tiles the slave image.

In one example embodiment, the required PTZ control adjustments to correct the slave camera's view can be determined by comparing the color and wavelet histograms of the two views. The corresponding image translation vector can be transformed into the perspective-corrected domain and used to generate the PTZ adjustment commands. Using only a proportion of this translation vector can maximize the convergence of the slave camera to the desired status. These PTZ adjustment control signals can be transmitted to the slave camera to obtain a better match between the view from the slave camera and the perspective corrected view for the said RoI from the master camera. The image matching and PTZ control-sending process can be implemented in an iterative manner to achieve the desired matching accuracy, which can be determined by using mean square error, mean absolute difference and histogram comparison, or other means.

The master and the slave cameras may have different color settings in practice. Before performing registration, their color histograms can be equalized so that they both have the same dynamic range, brightness and exposure levels, and possible color offsets are also removed by histogram equalization, which is a widely used image processing technique (see e.g., the text book entitled, Fundamentals of Digital Image Processing by Anil Jain, Prentice-Hall, N.J., 1988, which is hereby incorporated by reference).

The master camera can have the functionality to support privacy regions which obscure user defined regions from being outputted, as described in the U.S. patent application Ser. No. 11/178,232 entitled "Image Processing of Regions in a Wide Angle Video Camera," which is hereby incorporated by reference. As the view from the slave PTZ camera and a perspective corrected RoI in the master camera are matched, masks representing the shape of the privacy regions defined in the master camera can be applied to blank the appropriate regions in the slave image. In one example embodiment, this is done in the image processing circuitry 103.

In one class of preferred embodiments, once the two images are matched or registered, the control circuitry 104 dictates the desired image that will be composited in the image processing circuitry 103. If greater magnification is required, the relevant perspective corrected view can be replaced by the appropriately matched slave view. The intention of an example of this embodiment is to transition between the master view and the slave view as seamlessly as possible to create the quality of a continuous zoom function. Outputs from the image processing circuitry can include a number of perspective corrected views from the wide-angle image, the slave camera's view, or a collage of multiple views including any number of these.

The digital output is preferably passed to be formatted and compressed as necessary in the output circuitry 105 before being digitally output to the base station for monitoring. For example, multiple MPEG4 streams are possible. This process, describing the embodiment of FIG. 1, is illustrated using a flow chart in FIG. 8. The distorted wide-angle video image is captured using wide-angle master camera (Step 802). An RoI in the master camera is then defined (Step 804). The estimated PTZ commands are then transmitted to the salve camera from the master camera to achieve approximate view matching with RoI (Step 806). The output of the slave camera is then reverse transformed by the master camera (Step 808). The distorted slave image is then compared with the distorted wide-angle image to determine and transmit adjustment PTZ control signals to the slave camera (Step 810) to determine whether the desired matching accuracy ahs been met (Step 812). If the desired matching accuracy has been met, then the process continues on to Step 814. If the desired matching accuracy has not been met, then the process is looped back to Step 806. Once the desired matching accuracy has been met, the perspective corrected master camera view is replaced by adjusted slave camera view to achieve an expanded zoom function (Step 814).

The method and systems can have several slave cameras. Such method and systems can track several moving regions at the same time by assigning each moving object into a different slave camera producing a sharper image of the moving blob. In this case, the perspective corrected view of the master camera can be replaced by the adjusted views of the slave cameras tracking moving blobs. An example embodiment is shown in FIG. 1B where a master camera controls two slave cameras with optional zoom capabilities.

Another variation embodiment of these inventions can use analog video for the output from the master camera. Conversion from digital-to-analog video and formatting can take place in the output circuitry 105. Another possible embodiment consists of two analog composite video output channels.

Another embodiment can use an analog slave camera. The analog video produced by this camera can be converted into digital video using an analog-to-digital converter (ADC) (206) as shown in FIG. 2. The output circuitry 205 can perform the formatting and compression required for digital video output from the master camera. As mentioned for FIG. 1, variations of the embodiment in FIG. 2 include systems with analog video output from the master camera. Conversion from digital-to-analog video and formatting can take place in the output circuitry 205.

Another embodiment with an analog-switching version of the system is shown in FIG. 3. In this embodiment the video from the slave PTZ camera is analog. The optical system 301, in conjunction with the image sensor 302, can be used to capture an image that can then be passed to the image processing circuitry 303 for correction. As mentioned in an example embodiment above, the correction can be an image warp that compensates for distortions introduced by the lens. The image processing circuitry 303, which can have a memory, can be comprised of either one or a cascaded set of microprocessors coupled with a high bandwidth bus to increase the available processing capability. The digital sensor data can be sent to the image processing circuitry 303 through a buffer or directly if the circuitry operates at a sufficiently high speed. This circuitry can also be responsible for debayering, color equalization and color balancing of the image. Characteristics of the image sensing 302, such as the exposure and aperture, and the image processing 303 can be controlled by the control circuitry 304.

In one preferred embodiment, the decision for whether the view from the slave is necessary is dictated by the control circuitry resident in the master camera 304, which can act on a resident software program and/or from base station control. The control from the base station can be any standard, including RS485 or TCP/IP format. The slave camera, preferable, is not controlled directly from the base station, but via the control circuitry in the master camera 304. It may be desirable for the user to be unaware that multiple cameras are in use.

In one example embodiment, the control circuitry 304 can perform approximate view matching between the master, wide-angle video camera and the slave PTZ camera if required. PTZ controls can be transmitted to the slave camera from the control circuitry in the master camera to achieve an approximate matching. In one preferred embodiment, this approximation uses PTZ presets in the slave camera. An alternative embodiment uses a slave camera, which can be commanded to turn to any PTZ state. Another alternative embodiment uses a slave camera in which the camera's position output is predictable and consistent when PTZ commands are issued. In an example of this embodiment, the slave camera could have a base that is controlled using stepper motors that are occasionally calibrated to a known position. Another embodiment can utilize a calibration technique in which the user calibrates a finite number of positions so that both of the cameras are viewing the same calibration object. The slave camera can then give a positional feedback signal, the value of which can be stored alongside the master camera view's virtual PTZ coordinates in a table in memory. Linear interpolation can be used to determine intermediate positions between these calibrated points. The slave PTZ camera view can thus be sent to a position in approximate matching with the desired RoI. In these analog solutions, it is possible for the slave camera to be commanded to move before a threshold-zoom level is exceeded. This pre-emption can reduce delays due to the transit time of the mechanical slave PTZ camera.

The output from the image processing circuitry 303 can be passed to the analog conversion and formatting circuitry 305 which can produce an analog output from the digital data. The outputs from the analog conversion and formatting circuitry 305 and the slave PTZ camera can be passed to video switching and output circuitry 306. This circuitry can be controlled by the control circuitry 304, which decides which video stream should be output on the appropriate output channel. The output from the video switching circuitry can be one or more analog video channels.

The master camera can have the functionality to support privacy regions which obscure user defined regions from being outputted, as described in the U.S. patent application Ser. No. 11/178,232 entitled "Image Processing of Regions in a Wide Angle Video Camera." A mask representing the shape of the privacy regions defined in the master camera can be generated in the image processing circuitry 303. As the view from the slave PTZ camera and a perspective corrected RoI in the master camera are approximately matched, this mask can be applied to blank the appropriate approximate regions in the slave image using the video switching and output circuitry 306. An alternative embodiment uses a slave camera having its own privacy region support that can be calibrated through the master camera.

FIG. 4 is a modified version of the embodiment in FIG. 3. In this example embodiment, the video from the slave PTZ camera is digital instead of analog. Thus the decision of which outputs to show can be conducted in the digital domain by the 'multiplexing, compression & formatting circuitry' 405. This can include an option of outputting either a single video stream or a combination of streams using multiplexing. The camera system can have a digital output (e.g. MPEG4). The mask representing any privacy regions defined in the master camera can be applied in this circuitry 405 to blank the appropriate approximate regions in the slave image. Apart from this final stage, the rest of the process follows the same steps as the procedure described for FIG. 3.

An alternative embodiment is shown in FIG. 5 where the slave camera has an analog video output that can be converted into digital video using an analog-to-digital converter (ADC) 506. Otherwise it follows the same process and layout as described in the description for FIG. 4.

Figure 6:
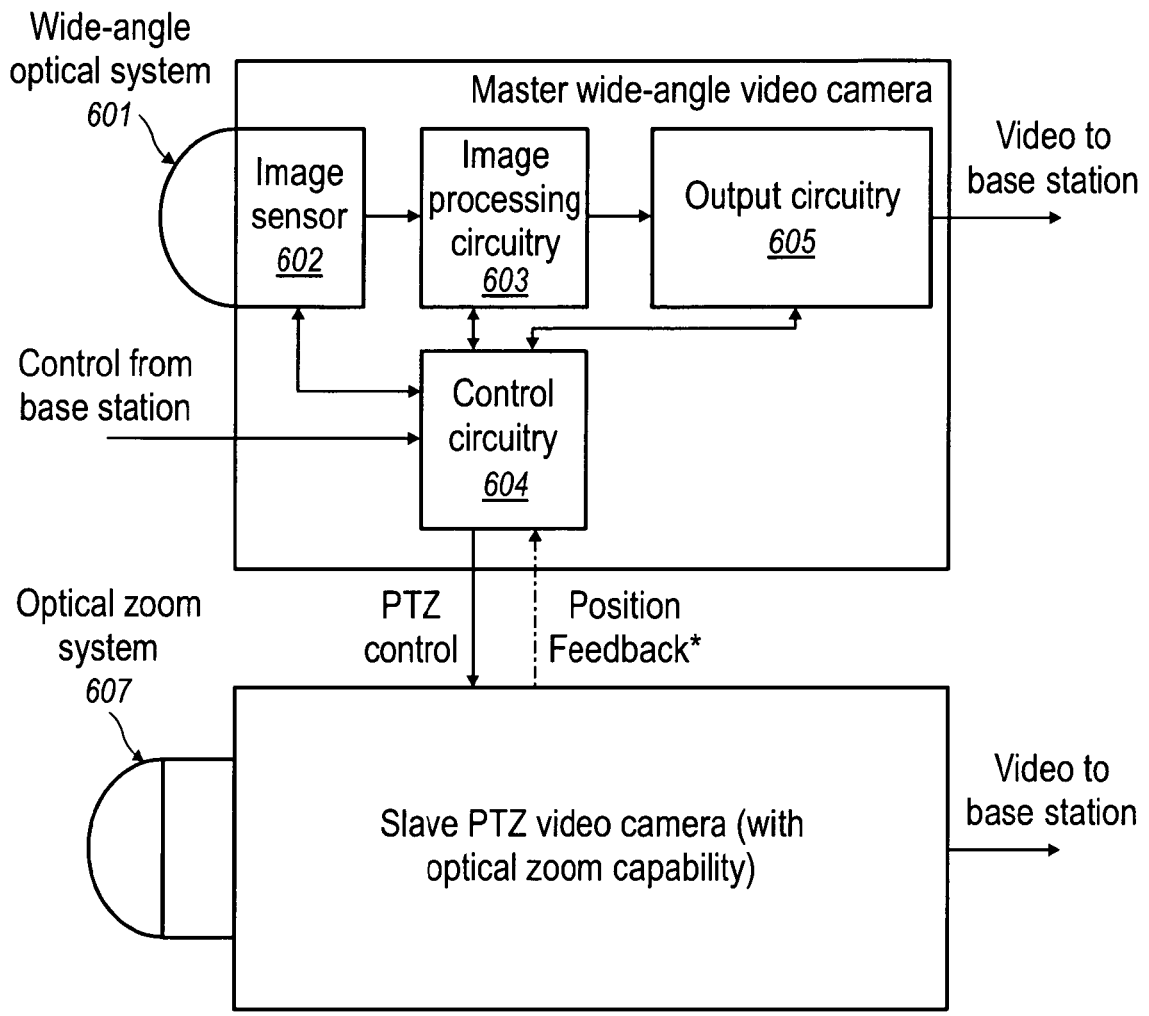
FIG. 6 shows a diagram of a camera system consistent with a preferred embodiment of the present invention.

The embodiment in FIG. 6 illustrates a layout in which video switching might not take place. The video output from the slave PTZ camera does not have to be passed to any circuitry in the master camera. The control circuitry 604 in the master camera can still be responsible for moving the slave camera to the desired approximate location to view the selected RoI. The two cameras can have separate video outputs. The output from the slave PTZ camera can be either analog or digital video. The digital output from the image processing circuitry 603 in the master camera can be formatted and compressed as necessary in the output circuitry 605 before being digitally outputted to the base station for monitoring. Multiple MPEG4 outputs are possible. A variation from this embodiment is a system with analog video output from the master camera. Conversion from digital-to-analog and formatting of the digital data from the image processing circuitry 603 can take place in the output circuitry 605. A possible embodiment consists of two analog composite video channels. The output from the slave PTZ can be either analog or digital video. Privacy regions can be implemented by using the slave PTZ camera's individual circuitry and configuration settings.

Motion Detection in the Master Camera:

Motion detection in the master camera can be carried out in preferred embodiments by using the well-known background-subtraction method. There are many public domain documents describing background estimation in video. The background of the scene can be estimated in many ways. The background image of the scene can be defined as those pixels belonging to stationary objects in the scene. For example, in the public domain article by R. Collins et al entitled "A System for Video Surveillance and Monitoring," which is hereby incorporated by reference, a recursive background estimation method is proposed based on the equation:

$$B_{n+1}(k, l) = aB_n(k, l) + (1-a)I_n \quad \text{if } I_n(k, l) \text{ is a stationary pixel,}$$

$$= aB_n(k, l) \quad \text{if } I_n(k, l) \text{ is a moving pixel.}$$

where $I_n(k,l)$ represent a pixel in the n-th image frame $I_n$ of the video captured by the master camera, and the image $B_{n+1}$ is the estimated background image at time instant n+1, and $\alpha$ is a parameter between 0 and 1. This recursive equation provides a weighted sum of past image frames. Temporary objects disappear over long time averaging and stationary objects of the scene remain in the background. The background estimation process can be carried out by other means as well. Likewise, motion detection itself can be carried out by other methods, within the scope of the present innovations.

The moving pixels of the current image are preferably estimated by subtracting the current image I.sub.n from the current background image B.sub.n. These pixels are then connected to a moving blob by connected component analysis, which is a well-known image processing technique (see e.g., Fundamentals of Digital Image Processing by Anil Jain, Prentice-Hall, N.J., 1988). Moving blobs in a video corresponds to persons or moving objects and they together with their local neighborhoods in the video define Regions of Interest because persons, moving objects, left objects in the scene etc. are important in security monitoring applications. Unlike conventional systems, which only capture recorded video for later analysis, real-time surveillance offers the added benefits of alarm and event triggers without delay. Therefore, such regions should be tracked and zoomed for closer inspection.

Tracking in the Master Camera:

Once a moving blob is detected, it can be tracked by the master camera. One preferred embodiment carries out the tracking in the master camera according to U.S. patent application Ser. No. 10/924,279, entitled "Tracking Moving Objects in Video Using Wavelet Domain Information" by A. E. Cetin and Y. Ahiska in the master camera using the wide-angle image frames of the video. In this patent application moving blobs are characterized by a one-dimensional histogram constructed from color and wavelet domain information of the blob. Blobs in the current image frame of the video and blobs in the previous image frame are compared to each other using the histograms of blobs. Histogram comparison is carried out using the mean-absolute difference or the Bhattacharya coefficient. Blobs producing the smallest mean-absolute difference are associated with each other.

In another embodiment, tracking can be initiated by pointing on an object. If the clicked pixel is inside a moving blob then this blob is tracked as above in the plurality of image frames forming the video. If the clicked pixel is not a part of a moving blob then a region-growing algorithm is initiated around the clicked pixel and pixels having similar characteristics are combined to form a blob. The color and wavelet histogram of the estimated region is compared with the histogram of the same region in the next image frame. If the color and wavelet histogram of this region changes over time then this means that the object started moving. This also means that some portions the region are likely to be a part of a moving blob determined by the motion detection algorithm of the camera. Once a decision is made that this stationary object is now a part of a moving object, then it is tracked as described in the above paragraph.

In many surveillance applications it is very important to get a high quality picture of a person or a moving object. The tracking algorithm provides the necessary information to get a closer picture of the moving object. The wide-angle camera described in U.S. patent application Ser. No. 10/837,325, entitled "Multiple View Processing in Wide-Angle Video Camera," has a zooming capability. This capability can be expanded by using a slave PTZ camera taking instructions from the master camera. An RoI encapsulating the center of mass of the tracked blob can be used to pass PTZ controls to the slave PTZ camera resulting in the salve camera zooming into the blob to achieve an expanded zoom capability.

The slave PTZ camera will often produce a sharper image of the blob compared to the corrected view of the blob obtained from the master wide-angle camera. This is because the master wide-angle camera zooms into a region by performing numerical interpolation, which smoothes the edges of the objects due to limited sensor resolution, in many cases leading to smooth pictures. By replacing the smooth picture obtained from the master camera with the sharp picture from the slave camera, the zooming capability of the system is expanded. As persons and moving objects (or objects which have moved in the past) are important in security monitoring applications, object tracking is useful in defining RoI for zooming to obtain a closer inspection.

As discussed earlier, a preferred embodiment can consist of a master camera and two slave cameras with optical zoom capabilities as shown in FIG. 1B. Alternative embodiments of the method and camera systems shown in FIGS. 2, 3, 4, and 5 can also consist of a single master and multiple slaves with optical zoom capabilities.

In one class of example embodiments, the method and systems have the flexibility of realizing the moving object tracking in the master camera or in slave cameras provided that slave cameras have built-in tracking capabilities. In one example of these embodiments, the master camera detects moving regions in the scene and assigns each moving region to a different slave camera. Each slave camera can then track a moving region using built-in tracking mechanisms.

Image Registration in the Master Camera:

The image of the moving blob and its immediate neighborhood captured by the slave PTZ camera and the corresponding view of the blob in the master camera can be registered in the master camera to achieve a high-quality picture of the RoI. Image registration can be implemented in the master camera in two stages. In the first stage some salient points in both a portion of the image of the master camera containing the moving blob and the transformed image of the PTZ camera can be determined by running the same algorithm in the two images. For example, if the master camera has an image from a fisheye, then the image of the slave PTZ camera is transformed into the distorted fisheye image coordinates. This also applies for other means of capturing wide-angle video such as using a peripheral lens. Since both images represent the same blob in the scene, the salient point detection algorithm should produce the same pixels as points of interest. Salient points can be determined using a wavelet domain method. After this stage the salient points of the two images can be matched to each other using the local color histograms around each point.

Figure 7:
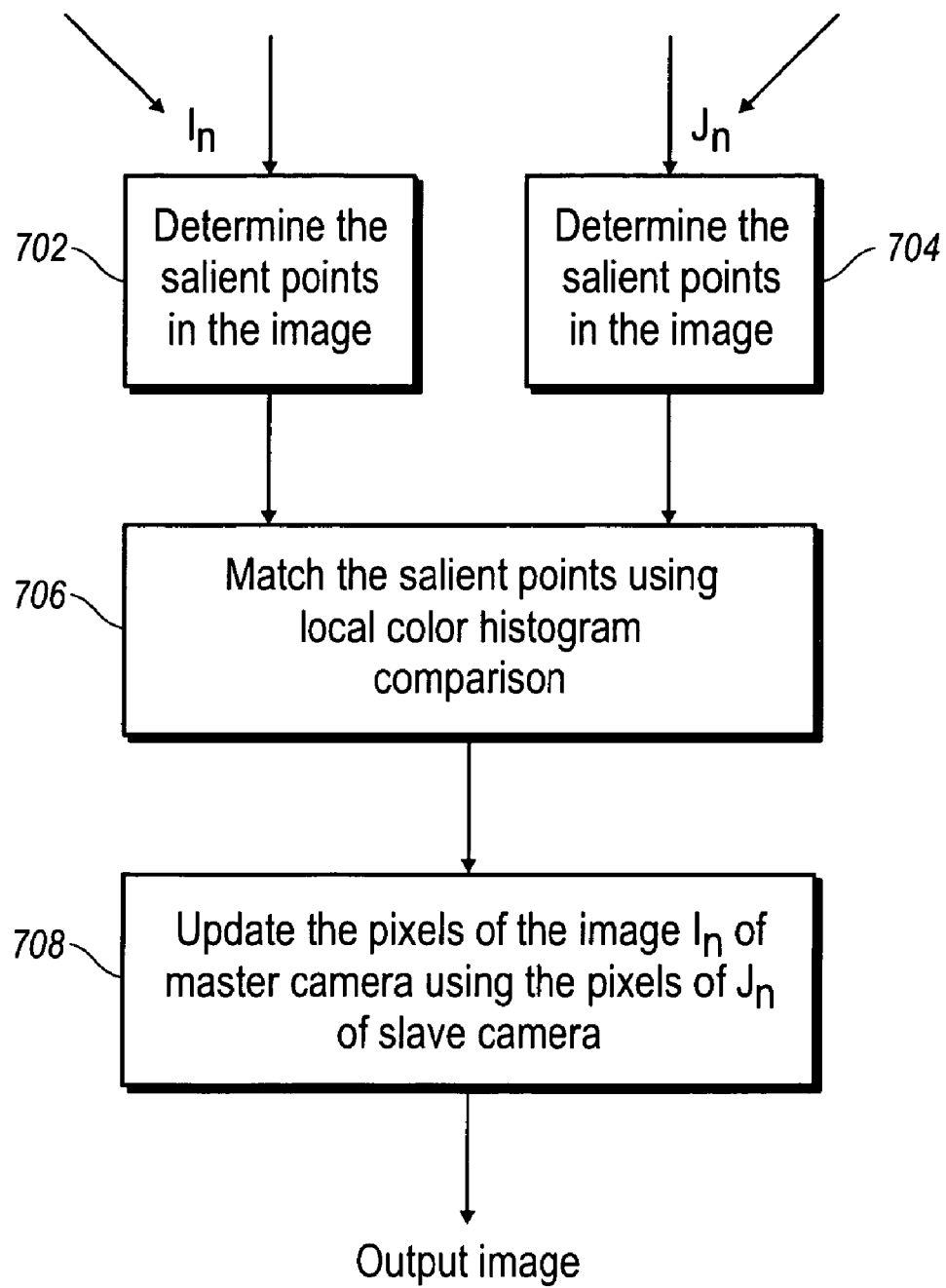
FIG. 7 shows a flowchart implementing process steps consistent with the preferred embodiment of the present invention.
Figure 8:
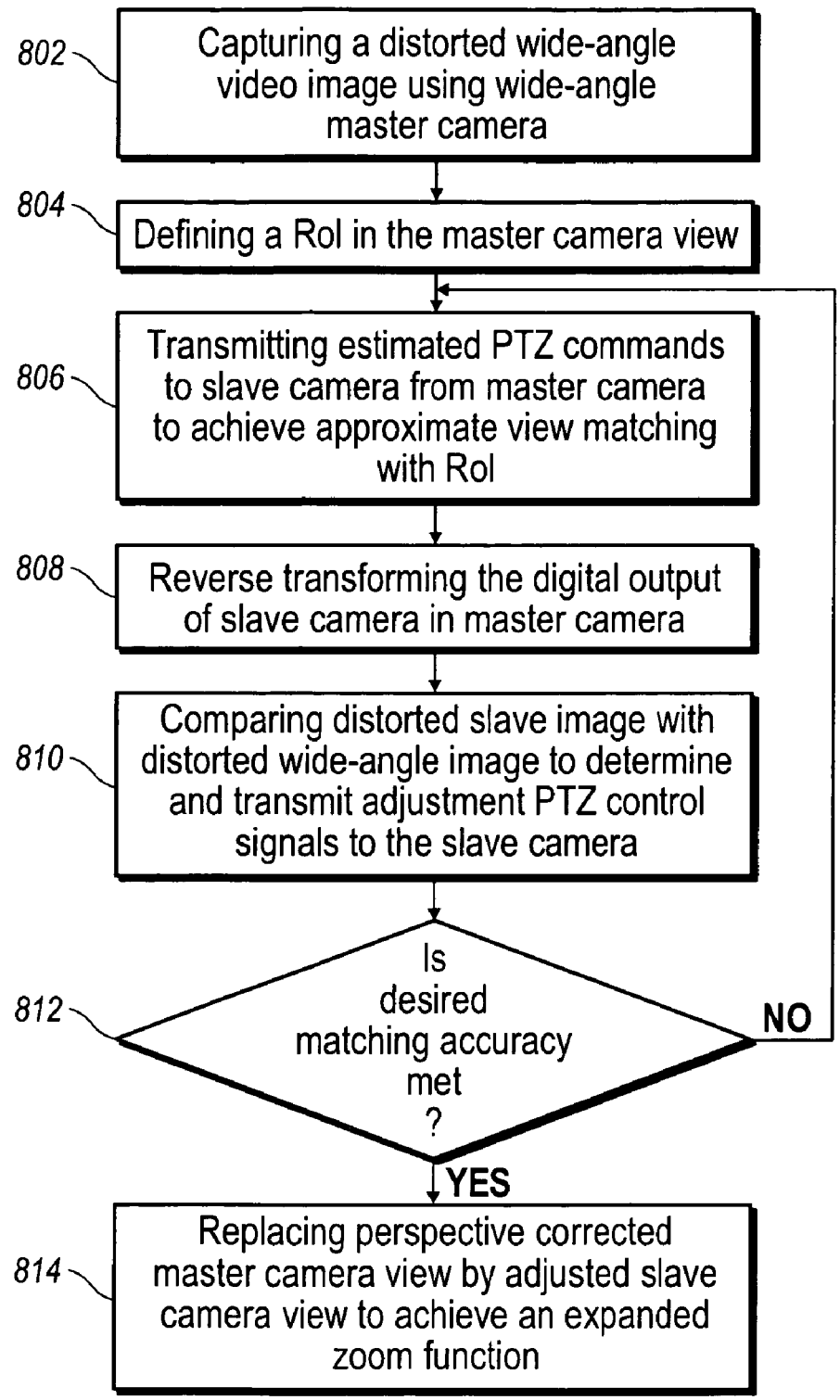
FIG. 8 shows a flowchart implementing process steps consistent with the preferred embodiment of the present invention.

A flow chart describing an example embodiment of this image registration algorithm implementation for the master camera is illustrated in FIG. 7. The current image $I_n$ represents the raw wide-angle image of the master camera and the image $J_n$ represents the transformed image of the slave camera. Using the $I_n$ input, salient points in the image are determined (Step 702). Using the $J_n$ input, salient points in the image are determined (Step 704). These two salient points are matched using local histogram comparison (Step 706). This information is then used to update the pixels of the image $I_n$ of master camera using the pixels of $J_n$ of slave camera (Step 708).

There are many public domain salient point detection algorithms in the literature (see e.g., the text book entitled, Fundamentals of Digital Image Processing by Anil Jain, Prentice-Hall, N.J., 1988). Commonly used ones include the Harris Corner detector and wavelet domain salient corner detectors. Wavelet transforms in two dimensions carry both space and scale (frequency) information. A salient point of an image can be defined as a pixel whose wavelet coefficients have relatively high amplitude values compared to other wavelet coefficients in all or some of high-frequency subband images of the wavelet transform. If a pixel is part of a flat region in the image, then its corresponding wavelet coefficients are ideally zero or very close to zero. If a pixel is on the horizontal (vertical) edge of an object then it produces high-amplitude wavelet coefficients in low-high (high-low) subband image and another set of high amplitude coefficients the high-high subband image obtained after one stage of the wavelet transform. On the other hand, if the pixel is on the corner of an object then it produces high-amplitude wavelet coefficients in low-high, high-low and the high-high subband images. Therefore significant corners of an image can be determined by thresholding high-amplitude wavelet coefficients in all subband images. It turns out that some of the salient points are on the corners and significant edges of the moving blob and its immediate neighborhood in the background part of the image.

Once the salient points of both images are detected they have to be matched to each other to register the two images coming from the master and slave cameras viewing the same object. The simplest matching process can be carried out by comparing the values of the corresponding pixels. However this may lead to incorrect results because an object may consist of a single color and all salient points may have the same or similar pixel values. Therefore it is better to compare the local neighborhoods around the salient points to achieve robust results. In some embodiments, this matching is performed by comparing the local color histograms around the salient points. A color histogram around a pixel can be determined in any color representation space. The most widely used color representation schemes include Red, Green, and Blue (RGB) and luminance and chrominance representations (YUV or YCrCb).

The normalized color histogram of a local region O around a salient point p in the image $I_n$ of the master camera is expressed as $$h_p(k) = (1/N) \sum_{s \in O} \delta(q(s) - k)$$

where s represents the color valued pixel s, O represents a local region around the salient pixel p, .delta. is the Kronecker-delta function, N is the number of data points in O, q is a quantizer function mapping the color space domain data into a L bit number. L is selected as 12 in this embodiment. The color histogram $h_p$, which is constructed from the color information around the pixel p characterizes this pixel.

Let h.sub.q(k) is another normalized histogram around the salient pixel q in the image J.sub.n of the slave camera. Histograms h.sub.p(k) and h.sub.q(k) can be compared to each other in many ways. Mean-absolute difference (MAD) gives a measure of comparison:

$$\|h_p - h_q\|_1 = (1/K) \sum_{k=0}^{K-1} |h_p(k) - h_q(k)|$$

where $K=2^{12}$ is the number of points in the normalized color histogram. If the mean-absolute difference distance between p-th salient point and the q-th salient point are smaller than distance between the other salient points then p-th salient point of the image $I_n$ is assigned to the q-th salient point of the image $J_n$.

Other color histogram comparison measures include the mean square error, cross correlation, and the Bhattacharya measure:

$$D(h_p, h_q) = \sum_k \sqrt{h_p(k) h_q(k)}$$

Higher the Bhattacharya measure D of h.sub.p(k) and h.sub.q (k) better the match between the histograms h.sub.p(k) and h.sub.q(k).

Once the salient points of images from the master and the slave cameras are matched the pixels of the image I.sub.n are updated in the master camera using the pixels of J.sub.n according to the matched salient points.

Image registration in the system is preferably an iterative process. A typical commercial PTZ camera can take finitely many (e.g. 128) possible physical viewing positions. The initial position information provided by tracking algorithm may not be accurate and as a result the PTZ camera may cover only a part of the region of interest and/or tracked object. In such a case, some of the salient points determined on the image of the master camera may not be matched. This means that additional position information should be transmitted to the PTZ camera to match almost all of the salient points in both images. Also, the initially registered image may not be detailed enough. For example, the tracked blob may be only a small portion of the image returned by the slave PTZ camera. The slave camera should zoom into the scene so that the tracked blob should become a large portion of the image returned by the slave PTZ camera. In this case, additional commands can be transmitted to the slave camera in an iterative manner as well. The iterative process can be terminated after comparing the two images. The comparison of distorted slave image from the PTZ camera with the raw wide-angle video image can be performed using many commonly used image comparison measures including mean square error (MSE), mean absolute difference (MAD), and matching the colour histograms the two images. If the MSE, MAD or color histogram difference between the two images drops below a threshold then the iterative registration process is terminated.

In the above paragraphs, the image registration process is described for a single slave camera. Extension of the above image registration method to multiple slave cameras monitoring different RoI's is straightforward. Video images produced by slave cameras are placed on the perspective corrected view of the master camera one by one.

Slave cameras can communicate with the master camera via RS485 bus or any other bus capable of carrying positional data information.

Further Information

The following documents can be used for further information in the field of the invention and are hereby incorporated by reference.

REFERENCES CITED

U.S. Pat. No. 6,509,926, entitled "Surveillance Apparatus for Camera Surveillance System," which is hereby incorporated by reference.
U.S. Pat. No. 6,724,421, entitled "Video Surveillance System With Pilot and Slave Cameras," which is hereby incorporated by reference.
U.S. Pat. No. 6,147,709, entitled "Method and Apparatus for Inserting a High Resolution Image Into a Low Resolution Interactive Image to Produce a Realistic Immersive Experience," which is hereby incorporated by reference.
U.S. patent application Ser. No. 10/837,326, filed Apr. 30, 2004, entitled "Multiple Object Processing in Wide-Angle Video Camera," which is hereby incorporated by reference.

U.S. patent application Ser. No. 10/837,325, filed Apr. 30, 2004, entitled "Multiple View Processing in Wide-Angle Video Camera," which is hereby incorporated by reference.

U.S. patent application Ser. No. 10/837,019, filed Apr. 30, 2004, entitled "Method of Simultaneously Displaying Multiple Views for Video Surveillance," which is hereby incorporated by reference.

U.S. patent application Ser. No. 10/924,279, filed Aug. 23, 2004, entitled "Tracking Moving Objects in Video Using Wavelet Domain Information," by A. E. Cetin and Y. Ahiska, which is hereby incorporated by reference.

U.S. patent application Ser. No. 10/837,012, filed Apr. 30, 2004, entitled "Correction of Optical Distortion by Image Processing," which is hereby incorporated by reference.

U.S. patent application Ser. No. 11/178,232, filed Jul. 8, 2005, entitled "Image Processing of Regions in a Wide Angle Video Camera," which is hereby incorporated by reference.

PUBLIC DOMAIN DOCUMENTS

[1]—X. Zhou, R. Collins, T. Kanade, and P. Metes, "A Master-Slave System to Acquire Biometric Imagery of Humans at Distance," ACM International Workshop on Video Surveillance, November, 2003, which is hereby incorporated by reference.

[2]—R. Collins, Lipton and Kanade, "A System for Video Surveillance and Monitoring," in Proc. American Nuclear Society (ANS) Eighth International Topical Meeting on Robotics and Remote Systems, Pittsburgh, Pa., Apr. 25-29, 1999, which is hereby incorporated by reference.

[3]—"Fundamentals of Digital Image Processing" by Anil Jain, Prentice-Hall, N.J., 1988, which is hereby incorporated by reference.

MODIFICATIONS AND VARIATIONS

As will be recognized by those skilled in the art, the innovative concepts described in the present application can be modified and varied over a tremendous range of applications, and accordingly the scope of patented subject matter is not limited by any specific exemplary teachings given.

For example, it is contemplated that the present innovations can be implemented using any number of different structural implementations. An alternative embodiment of the present invention includes, but is not limited to, a single physical structure housing both master and slave cameras and all necessary circuitry, separate housings for the master camera, all slave cameras, and all necessary circuitry or any combination of the above housing distributions.

In another class of contemplated embodiments, the present innovations can be implemented by adding a fourth axis of mobility to the slave camera. For example, the slave camera can Rotate as well as Pan, Tilt and Zoom.

Further, these innovative concepts are not intended to be limited to the specific examples and implementations disclosed herein, but are intended to included all equivalent implementations, such as, but not limited to, using different types of cameras for the master and slave cameras. This includes, for example, using PTZ controllable for both the master and slave cameras. This also includes, for example, using cameras with zoom capabilities for both the master and slave cameras, or for neither the master nor slave cameras.

In another class of contemplated embodiments, the present innovations can be implemented using, in addition to motion detection and object tracking, 3d-perspective view comparisons to identify the RoI. For example, if the master camera was aimed at a row of windows, the image processing circuitry could be programmed to ignore unimportant movement, such as leaves falling, and only identify as RoI open windows.

An alternative and less preferred embodiment of the present innovations can be implemented using optical, digital, mechanical, or any of a number of different ways of doing optical zooming.

An alternative embodiment utilizes two master cameras. These can be, but do not have to be, positioned facing in opposite directions. These cameras can be, but do not have to be, fish-eye cameras. The advantage of this embodiment is that a global perspective can be achieved through the use of master cameras that may not have 360-degree viewing capability otherwise. This embodiment does not exclude the use of one, single master camera with a 360-degree field of view, such as a dome camera.

In another class of contemplated embodiments, one or several master cameras can control multiple slave cameras. These master cameras can control the slave cameras each independently, in a hierarchy, or in any of a number of different ways. In one example of this class of embodiments, one or several master cameras control one or several intermediate cameras, which control one or several slave cameras. An example implementation of this embodiment is the "daisy chain" the slave cameras so the master camera assigns separate tracking tasks either directly or indirectly through other slave cameras. The advantages of utilizing several slave cameras include, but are not limited to, obtaining different views of a single RoI, capturing several RoI, and/or following RoI as they pass behind physical structures. In an example of this embodiment, the slave cameras In another embodiment, the slave camera can have built-in tracking capabilities. In this embodiment, the slave camera could take over the tracking job after the master camera had assigned it. The master camera could then assign another tracking task to another slave camera.

In another class of contemplated embodiments, the master and/or slave cameras can be equipped with any of a number of different vision enhancements, including, but not limited to, night vision, infrared vision, or heat-sensing ability. The advantages of thermal sensitivity include, but are not limited to, better detection and tracking of heat producing objects such as cars, people and/or animals. The advantages of utilizing night vision or other low-light vision enhancement include the ability to monitor an unlit area at night.

None of the descriptions in the present application should be read as implying that any particular element, step, or function is an essential element, which must be included in the claim scope: THE SCOPE OF PATENTED SUBJECT MATTER IS DEFINED ONLY BY THE ALLOWED CLAIMS. Moreover, none of these claims are intended to invoke paragraph six of 35 U.S.C.sctn. 112 unless the exact words "means for" are followed by a participle. Moreover, the claims filed with this application are intended to be as comprehensive as possible: EVERY novel and non-obvious disclosed invention is intended to be covered, and NO subject matter is being intentionally abandoned, disclaimed, or dedicated.

What is claimed is:

1. A video camera system comprising:
   at least one first video camera capturing a wide angle image, a virtual camera image being an automatically extracted portion of specified direction and size within and smaller than said wide angle image; and at least one physically steerable second video camera capturing a second camera image, a region viewable by said second video camera at least partially overlapping with a region viewable by said first video camera, said second video camera being automatically steered in at least partial dependence on said direction;

wherein a portion of said second camera image at least partially matching a region shown by said virtual camera image replaces said matching region shown by said virtual camera image to produce a single output image.

2. The system of claim 1, wherein said virtual camera image is automatically extracted from said wide angle image by at least one of said first camera and a base station.

3. The system of claim 1, wherein said second video camera is automatically steered to improve a quality of match between said second camera image and a region of interest within said virtual camera image.

4. The system of claim 1, wherein said second camera image has a higher resolution than said virtual camera image.

5. The system of claim 1, wherein a resolution of said second camera image is adjusted based at least partially on an output resolution of a base station.

6. The system of claim 1, wherein whether said second camera image replaces said matching region is at least partially dependent on whether an object of interest is detected within said wide angle image.

7. The system of claim 1, wherein said second camera is steered in at least partial dependence on a detected object of interest within said wide angle image.

8. The system of claim 1, wherein, prior to display of said output image, distortion correction is performed on at least one of said wide angle image, said virtual camera image, said second camera image and said output image.

9. The system of claim 1, wherein whether said second camera image replaces said matching region is at least partially dependent on whether said second camera image has a higher resolution than said matching region.

10. A video generating method comprising:
capturing a wide angle image using at least one first video camera, a virtual camera image being an automatically extracted portion of specified direction and size within and smaller than said wide angle image; and
capturing a second camera image using at least one physically steerable second video camera, a region viewable by said second video camera at least partially overlapping with a region viewable by said first video camera, said second video camera being automatically steered in at least partial dependence on said direction;
wherein a portion of said second camera image at least partially matching a region shown by said virtual camera image replaces said matching region shown by said virtual camera image to produce a single output image.

11. The method of claim 10, wherein said virtual camera image is automatically extracted from said wide angle image by at least one of said first camera and a base station.

12. The method of claim 10, wherein said second video camera is automatically steered to improve a quality of match between said second camera image and a region of interest within said virtual camera image.

13. The method of claim 10, wherein said second camera image has a higher resolution than said virtual camera image.

14. The method of claim 10, wherein a resolution of said second camera image is adjusted based at least partially on an output resolution of a base station.

15. The method of claim 10, wherein whether said second camera image replaces said matching region is at least partially dependent on whether an object of interest is detected within said wide angle image.

16. The method of claim 10, wherein said second camera is steered in at least partial dependence on a detected object of interest within said wide angle image.

17. The method of claim 10, wherein, prior to display of said output image, distortion correction is performed on at least one of said wide angle image, said virtual camera image, said second camera image and said output image.

18. The method of claim 10, wherein whether said second camera image replaces said matching region is at least partially dependent on whether said second camera image has a higher resolution than said matching region.

19. The method of claim 10, wherein said second camera is zoomed out if a region of interest in said virtual camera image is moving and is zoomed in if said region of interest slows or stops moving.

20. A computer-readable medium having stored thereon instructions that, when executed, direct a computing apparatus to:
capture a wide angle image using at least one first video camera, a virtual camera image being an automatically extracted portion of specified direction and size within and smaller than said wide angle image; and
capture a second camera image using at least one physically steerable second video camera, a region viewable by said second video camera at least partially overlapping with a region viewable by said first video camera, said second video camera being automatically steered in at least partial dependence on said direction;
wherein a portion of said second camera image at least partially matching a region shown by said virtual camera image replaces said matching region shown by said virtual camera image to produce a single output image.

* * * * *